United States Patent
Milton

[11] 3,937,560
[45] Feb. 10, 1976

[54] SINGLE FIBER ACCESS COUPLER

[75] Inventor: A. Fenner Milton, Washington, D.C.

[73] Assignee: The United States of America as represented by the Secretary of the Navy, Washington, D.C.

[22] Filed: Nov. 29, 1974

[21] Appl. No.: 528,539

[52] U.S. Cl. ..................... 350/96 C; 350/175 GN
[51] Int. Cl.² ........................................... G02B 5/16
[58] Field of Search ....... 350/96 C, 96 WG, 96 GN, 350/175 GN

[56] References Cited
UNITED STATES PATENTS

| 3,832,030 | 8/1974 | Gloge | 350/96 C X |
| 3,870,398 | 3/1975 | Love | 350/96 C |
| 3,874,779 | 4/1975 | Thiel | 350/96 C X |

Primary Examiner—Archie R. Borchelt
Attorney, Agent, or Firm—R. S. Sciascia; A. L. Branning; M. L. Crane

[57] ABSTRACT

This system couples light from a single fiber transmission line to a separate output line which passes some light through the coupler to a single fiber transmission line which transmits the light on over a single optical fiber. A mirror within a portion of the coupler reflects out a portion of the light to the coupler output.

2 Claims, 3 Drawing Figures

SINGLE FIBER ACCESS COUPLER

BACKGROUND OF THE INVENTION

This invention is directed to radiation couplers more particularly to a radiation coupler for coupling radiation from a single fiber optic data transmission line to another single fiber optic data transmission line while permitting a controlled amount of radiation to be coupled off to another transmission line.

Heretofore optical radiation couplers have been used in multimode optical fiber transmission lines to couple radiation from one or more lines to other lines by use of straight through couplers, T-couplers, etc. Optical radiation has been transmitted over single fiber optic-lines in ornamental designs, in hairpieces, in optical systems in automobiles, and airplanes as well as other areas.

Optical data communication systems have been proposed for transmitting data over fiber optic lines from one point to another. In transmitting data, couplers are used to couple broken lines together, to couple radiation to other lines, to add radiation and to take off radiation for transmission to other points. Optical radiation is normally transmitted over a multimode fiber optic bundle which requires couplers for the same.

SUMMARY OF THE INVENTION

This invention makes use of focusing lens in combination with a coupler region to expand and collimate the output from a single fiber so that optical radiation may be coupled from one fiber to another and coupled off to a separate line. A mirror or mirrors may be positioned at a 45° angle to the axis of the optical path to couple out a fraction of the radiation to other lines.

DETAILED DESCRIPTION

Figure 1:
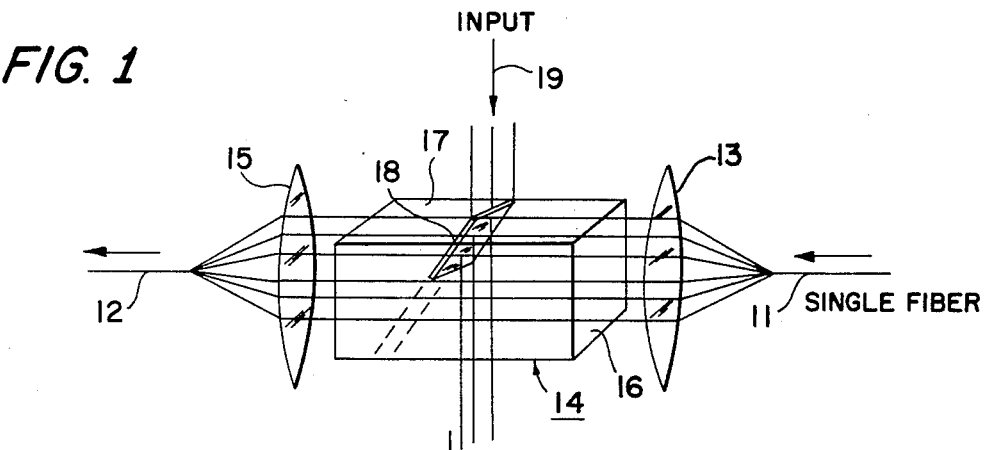
FIG. 1 illustrates a single focusing lens system in combination with an optical transmission block for carrying out the purposes of the invention.

Now referring to the drawing there is illustrated in FIG. 1 a coupler for coupling optical radiation from one single optic fiber to another and for coupling off a portion of the radiation to other systems. As shown, the device includes an input and output single optic fiber transmission lines 11 and 12, respectively. Radiation from the single input fiber optic line is optically transmitted to a lens 13 which expands and collimates the optical beam. The expanded and collimated beam is directed onto a rectangular block 14 of optically transparent material which directs the radiation toward a second lens 15. The second lens focuses the incident collimated beam to a point into the output line 12.

The optically transparent block is formed by two pieces of like material 16,17 bonded together to include a mirrored surface 18 along a portion of the joint. As shown, the mirrored surface 18 extends along the surface sufficiently that a portion of the optical path directly through the rectangular block between the input and output fiber is blocked by the mirrored surface.

In the operation of the device shown in FIG. 1, radiation transmitted through the input single fiber 11 is directed onto the lens 13. The lens 13 expands and collimates the incident radiation, and directs the expanded collimated radiation into the adjacent end of the rectangular block portion 16. The radiation is transmitted in collimated lines such that the upper portion of the radiation beam is incident on the mirrored surface 18 and is reflected out of the block 14 at a right angle with respect to the entrance beam. The lower portion of the collimated beam is directed on through the rectangular block onto the lens 15 which focuses the radiation portion into the end of optic fiber 12. Simultaneously, radiation may be added to the portion of the radiation signal from optic fiber 11 that passes through the rectangular block by an input 19 perpendicular to the upper surface of the rectangular block and is in optical alignment with the mirrored surface. The added radiation is reflected by the mirrored surface out of the rectangular block portion 17 onto lens 15 which then focuses the added radiation into the end of fiber optic 12. Thus, a radiation signal may be added to the main signal and a portion of the main signal may be directed out of the rectangular block to another transmission line or to a detector.

Figure 2:
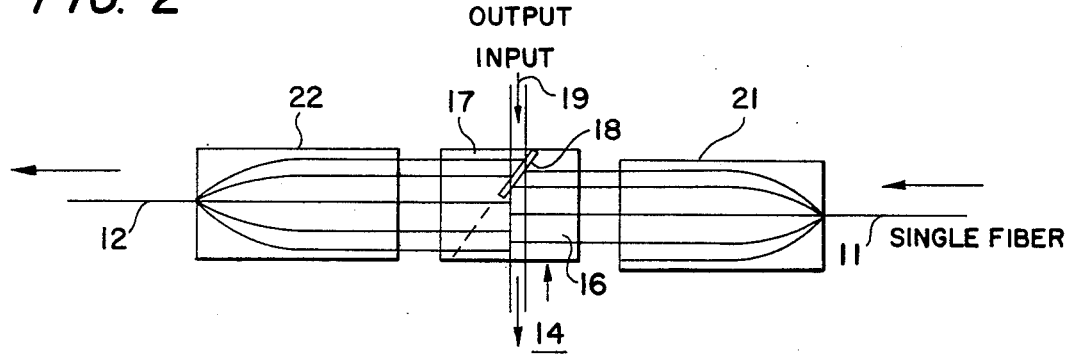
FIG. 2 illustrates a modification of the system in FIG. 1 which uses different types of focusing lens.

FIG. 2 illustrates a modification of the device shown and described in FIG. 1. The difference in the device of FIG. 2 from that of FIG. 1 is in the focusing lens. FIG. 2 illustrates Selfoc lens 21 and 22 which expands and collimates the radiation. A Selfoc lens is a light focusing glass device which is a trade name of the Nippon Sheet Glass Co. Ltd. and Nippon Electric Co. Ltd., Osaka, Japan. The Selfoc lens illustrated in FIG. 2 is a lens made from an optically transparent cylindrical rod with a parabolic variation of the optical index of refraction and a length such that the lens has an infinite working distance. The operation of the Selfoc lens is reciprocal in operation. Collimated radiation is focused to a point or radiation from a point is expanded and collimated. The operation of the Selfoc lens is the same as that of the lens described for FIG. 1.

Figure 3:
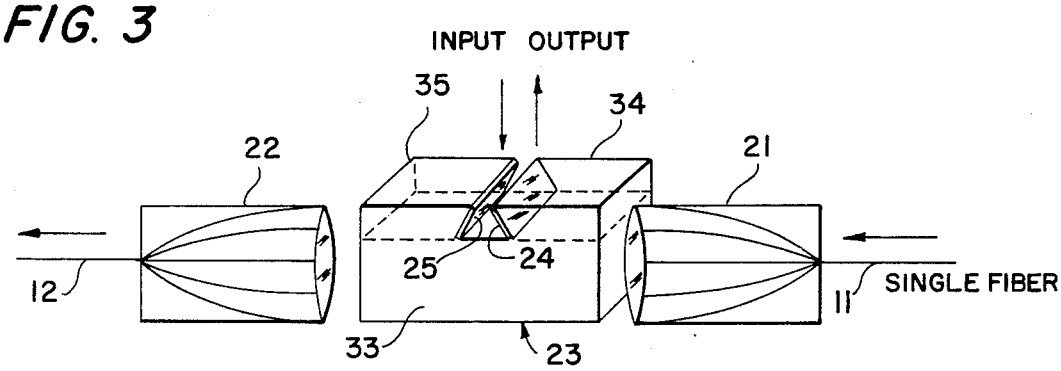
FIG. 3 illustrates a modification in which the optical transmission block is formed by use of three optical transmission material blocks bonded together.

FIG. 3 illustrates a single fiber optic communication system including Selfoc lenses as shown in FIG. 2 wherein the rectangular block 23 is modified to include two reflective surfaces 24 and 25 with their angles at 45° relative to the input optical path. The two reflective surfaces 24 and 25 form a right angle with respect to each other so that incident radiation is reflected in the same optical plane. The rectangular block is made in three sections 33–35 of the same index of refraction material and bonded together with a bonding material such as epoxy which has the same optical index of refraction as that of the block material. The lower portion 33 is more than one half the thickness of the block and the upper two sections 34 and 35 are formed with one end at a 45° angle relative to the upper and lower surfaces. The angled ends are mirrored and form the reflective surfaces 24 and 25.

In operation of the device of FIG. 3, radiation entering the Selfoc lens 21 will expand and collimate the incident radiation from single fiber optic 11. The collimated radiation will enter the rectangular blocks 33 and 34. The radiation entering block 33 will pass directly through the block to Selfoc lens 22 and be focused into the end of single, optic fiber 12. The portion of the radiation that enters block 34 will be reflected upwardly by the mirrored end 24 and out to a desired transmission line or optical device. Radiation may be added to the system by an input into the mirrored end 25 of block 35 in which the mirrored surface reflects the radiation out and onto the end of the Selfoc lens. The Selfoc lens will then focus the radiation into the end of single fiber optic transmission line 12. Thus, radiation may be reflected from the rectangular block and into the rectangular block on the same surface plane. In one instance, radiation is added to the system in the other instance a portion of the radiation from the Selfoc lens is reflected out of the main transmission system.

Use of beam expansion and refocusing allows for the use of microscopic dimensions in the coupling region, so that, mirrors can be used to couple to a single fiber transmission line. The angle of incidence as a function of position transformation properties of ideal lenses will allow this approach to coupling to be used with Selfoc fibers with low throughput loss. The acceptance angle of a Selfoc fiber varies with distance from the core center which means that any coupler approach which solely preserves angle of incidence will be very lossy. Any abberations in the lens systems used with this invention will introduce losses.

Obviously many modifications and variation of the present invention are possible in light of the above teachings. It is therefore to be understood that within the scope of the appended claims the invention may be practiced otherwise than as specifically described.

What is claimed and desired to be secured by Letters Patent of the United States is:

1. A system for coupling radiation on and off of a single optic fiber data transmission line while allowing a portion of the radiation to be transmitted into a single optic fiber for transmission, which comprises:
   a first lens for expanding and collimating incident radiation from a single optic fiber transmission line;
   a second lens for collimating and focusing collimated radiation into the end of an optic fiber data transmission line;
   a rectangular block of optically transparent material positioned between said first and second lens in optical alignment therewith;
   said rectangular block including a reflective surface therein at a 45° degree angle with respect to incident optical radiation;
   whereby said reflective surface reflects a portion of the radiation incident on said reflective surface out of said rectangular block normal to incident radiation and said reflective surface reflects input radiation onto said second lens and into the end of said single optic fiber data transmission line.

2. A system as claimed in claim 1 which includes:
   two reflective surfaces in said rectangular block of radiation transparent material.

* * * * *